INVENTORS
TADAO HORIGUCHI
TOSHIKATU ISHIKA
AKIO MATSUO

BY Woodhams, Blanchard & Flynn
ATTORNEYS

United States Patent Office 3,547,816
Patented Dec. 15, 1970

3,547,816
METHOD AND APPARATUS FOR WASTE WATER PURIFICATION
Tadao Horiguchi, Akio Matsuo, and Toshikatu Ishika, Yokohama-shi, Japan, assignors to Kurita Water Industries Ltd., Osaka-shi, Japan, a corporation of Japan
Filed Nov. 18, 1968, Ser. No. 776,391
Claims priority, application Japan, Dec. 1, 1967, 42/77,109; Dec. 4, 1967, 42/77,772
Int. Cl. B01d 23/24; C02c 5/04
U.S. Cl. 210—15         5 Claims

ABSTRACT OF THE DISCLOSURE

A method and an apparatus for purifying organic waste waters by introducing oxygen therein through aeration and letting the aerobic waste waters flow into filter bed which is designed to have it surface layers continuously removed by scraping.

BACKGROUND OF THE INVENTION

Field of the invention

The present invention relates to a method for clarifying and purifying waste waters which first are aerated and then are filtered and also relates to an apparatus which functions for said purpose by filtering the waste waters and continuously scraping the surface layer of the filter bed without employing the conventional process of back-washing the bed.

Description of the prior art

Organic waste waters, such as sewage, contain a large amount of suspended solids and BOD components and they cannot be purified satisfactorily by conventional filtration apparatus because the filter bed of such an apparatus would get clogged very rapidly. In the past, accordingly, it was customary to effect the purification by means of a biochemical treatment, such as the activated sludge process. However, such a conventional biochemical treatment was, in practice, not desirable for the reason that it required complex processes and large-size equipment.

In the conventional filtration apparatus, the filter medium was packed therein to form a fixed filter bed and waste waters were fed onto the bed to flow downwardly therethrough. Therefore, whenever there occurred an increase in the filtration resistance due to sludge and other waste materials being deposited on the filter medium, it was necessary to remove these deposits from the filter medium by means of back-washing.

However, in most cases the increase in the filtration resistance occurred because only the surface layer of the filter bed became clogged, and no sludge was found deposited in any part other than on the surface layer of filter bed. This indicated that the filter bed was not functioning effectively as a whole, and, accordingly, it was quite uneconomical to conduct the aforesaid back-washing of the filter bed at such a stage. In view of the foregoing, and also because of the additional drawback that those organic matters absorbed on the filter bed become anaerobic and produced a water soluble BOD component into the water effluent thereby deteriorating the quality thereof, the apparatuses of the prior art were considered to be unsatisfactory.

The present invention has ameliorated the aforesaid defect of the prior art by maintaining the waste waters in an aerobic state by means of aeration and feeding the waters thus processed into a filter bed comprising a filter medium whose surface layers are continuously scraped for the purpose of maintaining sufficient filtration.

SUMMARY OF THE INVENTION

The object of the present invention is to provide a method which will make it possible to prevent putrefying of waste water within the filter bed and to prify said waters by filtration under suitable conditions. Another object of the present invention is to provide filter equipment which will function continuously for a long period of time without requiring back-washing of the filter bed in which the filter bed has its surface continuously scraped, to remove the matter adsorbed thereon, and to expose the filter bed in such a condition as to permit the flowing of waste waters therethrough to effect sufficient filtration. The present invention combines the process of aeration and that of filtration of the waters thus aerated by bringing them into contact with a filter bed which is always kept clean, in order that the aforesaid object can be attained.

DESCRIPTION OF THE PREFERRED EMBODIMENTS

In the present invention, waste waters are introduced into a filter bed formed by packing crushed and sized coal, and filtration thereof is performed while the filter bed is continuously scraped so as always to bring the waste waters into contact with the clean surface of filter medium of the filter bed. As a result, the original waste waters can be discharged in a purified state after carrying out the aforesaid filtration process.

A filter bed of crushed and sized coal, when sewage and other waste waters are fed therethrough, removes most of such components as suspended solid matters, BOD, COD, and the like from the raw waste water, and makes it possible to obtain a treated water of as good a quality as was obtained by the conventional activated sludge purification.

When treating raw waste waters of a high concentration of suspended solid matter, the degree of clogging of the surface of the filter bed is so tremendous that it is advisable, as a preventive measure, to feed the waste waters while scraping the filter bed surface with a scraper, and removing the crushed and sized coal forming the surface layer of the filter bed of the apparatus, in view of the fact that the crushed and sized coal is expendable. Coal removed from the filter bed may be dried and incinerated.

In the treatment of a high temperature waste water, especially in the summer season, dissolved oxygen in the raw waste water is consumed by a biochemical reaction with organic matters before said waste water is fed into the filter or while it is present therein, and the condition within the filter bed becomes anaerobic thereby causing suspended solid matters caught to the filter bed to putrefy. If this happens, the suspended solid matters are converted into water soluble BOD components as a result of putrefaction, and they dissolve into the effluent, this resulting in a deterioration of the quality of said effluent.

If such putrefaction occurs in the course of sewage filtration, even though the suspended solid matters was filtered out almost completely, the quantity of the water soluble BOD components in the effluent will become equivalent to that of the raw waste water and its putrid smell will become stronger.

The present invention is intended to prevent such putrefaction as described above of any organic waste water within the filter bed and to perform filtration by dissolving oxygen into the raw waste water through aeration so as to maintain the quality of the effluent in a desirable range. Accordingly, by the employment of the processes of the present invention, the inside of the filter bed will be maintained in an aerobic condition, and the formation of water soluble BOD due to putrefaction will be prevented.

BRIEF DESCRIPTION OF THE DRAWING

In FIG. 1, 1 is a settling tank, 2 is a reservoir, 3 is the 1st filter tank, and 4 is the 2nd filter tank. Settling tank 1 is connected with a feed pipe 5, and reservoir 2 is provided with an air diffusing pipe 6. The first filter tank 3 is packed with crushed and sized coal to form a filter bed 3a and a scraper blade 3b is provided on the filter bed 3a. Said scraper blade 3b is so designed as to scrape the surface of filter bed as said blade revolves and moves downwardly. Sludge thus scraped off can be discharged outside the system through a sludge discharge pipe 7 which extends from the center part of the apparatus. The second filter tank 4, which has the same structure as that of 1st filter tank 3 is equipped with a filter bed 4a a scraper blade 4b. A coupling pipe 8 between the 1st filter tank 3 and the 2nd filter tank 4 is connected to a compressor 9. 10 is the effluent pipe.

Figure 1:
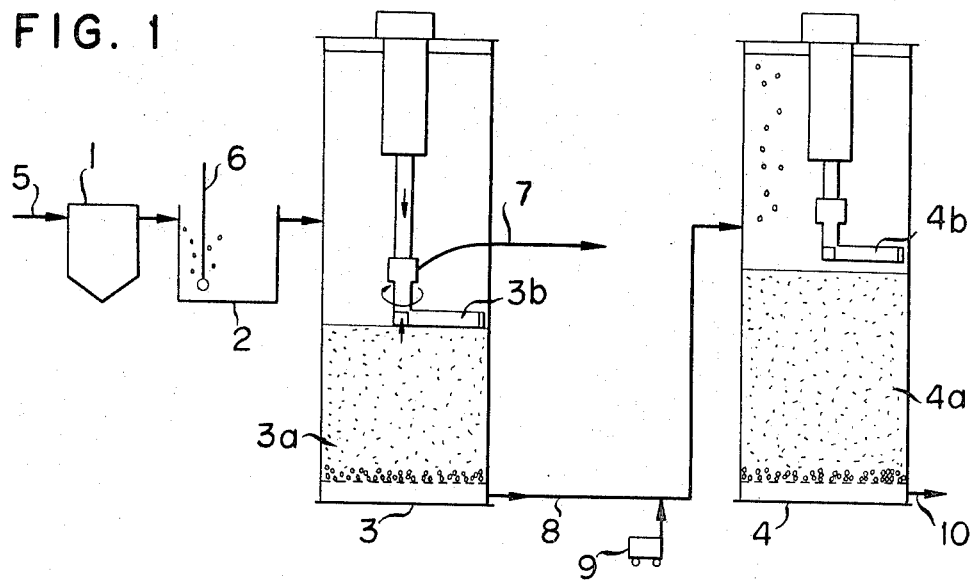
FIG. 1 is a schematic drawing of system, which illustrates example of apparatus designed for practicing the present invention.

Raw waste water is introduced into the settling tank 1 through the raw waste water pipe (i.e., feed pipe) 5 and held stagnant therein for a specified period of time so that heavy materials admixed therein such as sand and the like may settle. Raw waste water from which such heavy materials have been separated is introduced into the reservoir 2 wherein air is bubbled through air diffuser 6 to dissolve oxygen in the raw waste water.

The raw waste water held in reservoir 2 is taken out little by little and is fed into the 1st filter tank 3 wherein filtration is carried out. Scraper blade 3b is operated so that it descends as it turns around and thereby the surface of filter bed 3a is scraped off little by little. Sludge thus scraped off is discharged outside the tank 3 by means of the sludge discharge pipe 7 while filtration is being performed. Organic matters and suspended solids contained in the raw waste water are caught on the surface of the filter bed 3a, but said surface of the filter bed is scraped prior to an increase in the filtration resistance, and accordingly, filtration is always carried out through a fresh surface. At the same time, since a sufficient amount of oxygen is added into the raw waste water, there is no fear that said water will become anaerobic and putrefy or that suspended solids which are caught in filter bed will putrefy, and accordingly, a water soluble BOD component will not be produced.

The effluent from the 1st filter tank 3 is mixed with air, which is fed into the coupling pipe 8 by the compressor 9, to replenish oxygen while passing through said coupling pipe, and thereafter the aerated waste water is fed into the 2nd filter tank 4. Although almost of the suspended solids and organic matters are caught in the 1st filter tank 3, in a very small amount of the residue is adsorbed in the 2nd filter tank 4. No scraping of the filter bed 4a is conducted in the 2nd filter tank 4. It will be noted, however, that after scraping away the entire filter bed 3a in the 1st filter tank 3, while the same tank, i.e., the 1st filter tank 3 is being packed again with crushed and sized coal, the 2nd filter tank can function to carry out the primary filtration.

As seen in the above description, the present invention serves to purify waste water containing a large quantity of suspended solid matters and organic matters into good-quality water merely be means of filtration thereof. Not only that, the apparatus employed can be substantially small in size and still function efficiently.

Figure 2:
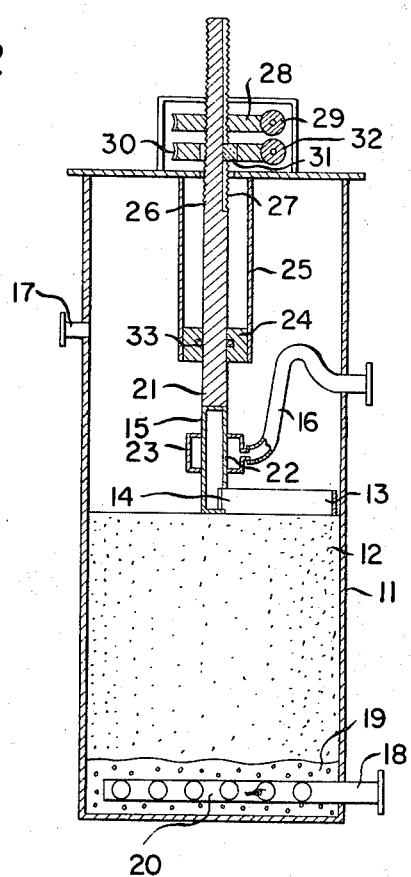
FIG. 2 is a longitudinal sectional view of the filter apparatus to be employed in the present invention.

FIG. 2 shows an example of a filtration apparatus capable of being used for such waste water purification as described above. The filtration apparatus of the present invention comprises filter tank 11, a filter bed 12 packed within filter tank 11, a scraper blade 13 which turns round on the surface of filter bed 12 and scrapes off the surface layer thereof, a sludge collecting pipe 15 which has a sludge intake opening 14 at the base of scraper blade, and a flexible sludge-discharge pipe 16 which leads to the outside of apparatus from the sludge collecting pipe 15 above the filter bed 2. The apparatus is designed to discharge sludge scraped up from the filter bed surface by the scraper blade 13, which turns round as it descends, through the sludge discharge pipe 16 connected with the sludge collecting pipe 15.

The filter tank 11 is of a pressure-resisting constuction, and is provided with a feed pipe 17 in the upper part and an effluent pipe 18 located in the bottom of the tank. At the bottom of the inside of the filter tank there is installed a supporting bed 19 composed of gravel and the like, and in this bed is laid an affluent collecting pipe 20 which is connected with effluent pipe 18. Above the supporting bed 19a, filter medium comprising sand, sized coal, and the like is packed, thus providing the filter bed 12.

The scraper blade 13 is curved in the shape of spiral on the surface of the filter bed, and its base is fixed to the sludge collecting pipe 15. At the part of the sludge collecting pipe 15 where the scraper blade is fixed, there is provided the sludge intake 14 so that it may take in the sludge scraped and collected by turning of the scraper blade 13. The sludge collecting pipe 15 is installed upright in the center of filter tank 11 and is coupled with a rotary shaft 21, and is designed to rotate with said shaft 21.

The sludge collecting pipe 15 is provided with sludge outlet 22 on its side wall a stationary casing 23 encloses the sludge outlet 22 and is fitted to the sludge collecting pipe 5. Casing 23 is connected with flexible sludge discharge pipe 16 and serves to discharge sludge collected within sludge collecting pipe 15 to the outerside of apparatus. Rotary shaft 21 enters into cylinder 25 through a guide 24, and extends through the upper wall of the filter tank 11 and extends above the tank. The upper part of the rotary shaft 21 is provided with a thread 26 and a vertical groove 27.

Above the upper wall of the filter tank 11, there is provided a desceding-gear 28 screwed to the rotary shaft 21, and this mates with worm 29. There is also a turning-gear 30 fixed to the vertical groove 27 by means of a key 31 and this turning-gear 30 meshes with worm 32. In the 31 guide 24, there is provided a sealing medium 33 which is provided to maintain the interior of cylinder 25 in a water-tight condition.

The filtration operation is performed by introducing raw waste water into the apparatus through feed pipe 17 and discharging treated water through effluent pipe 18. During this operation, worms 29 and 32 revolve to cause scraper blade 3 to revolve as it descends and thereby scrape the filter bed so that the surface of the filter bed may be kept clean enough to effect satisfactory filtration.

The turning gear 30 rotates as worm 32 turns, and thereby the rotary shaft 11 revolves. Worm 29 is also made to turn thereby turning the descending-gear 28 when both gears rotate at the same r.p.m., screw 26 which threadedly engages the descending-gear 28 does not advance and, therefore, the rotary shaft 21 does not descend, either. However, if the rate of rotation of the gear 28 is less than that of the gear 30 the screw 26 is advanced and thereby allows the rotary shaft 21 to descend as it rotates. Since the scraper blade 13 is connected with the rotary shaft 21 through the sludge collecting pipe 15, the scraper blade 13 also turns round in company with the rotation of the rotary shaft 21, and thereby scrapes the surface of filter bed and gathers up sludge at the center part of filter bed. Sludge thus scraped and gathered is discharged outside by way of sludge intake 14, sludge collecting pipe 15, sludge outlet 22, casing 23, and sludge discharge pipe 16. Since the thus discharged sludge contains much water, such a method as sedimentation is employed to separate the solid matters therefrom, and the separated liquid is fed again into the feed pipe 17 to be treated in filter tank 11, while the concentrated solid matters may be utilized a fuel for boilers and the like after dehydration. Worms 29 and 32 are each driven by their respective variable-speed motors (not shown) so that the selection of r.p.m. and lowering speed of scraper blade in proportion to the quality and volume of waste waters to be fed at the operator's option. Furthermore, whenever the filter medium is consumed and its bed is entirely scraped, scraper blade 13 can be raised so as to make it possible to replenish the filter medium and thereafter resume the filtration operation.

In the present invention, the sludge discharge pipe is installed above the filter bed so that it is possible to allow the scraper blade 13 to descend down to the bottom of the filter bed 12 and, accordingly, utilize the entire filter bed most efficiently.

As elucidated in the foregoing, the present invention employs a scraper blade which functions, as it rotates and descends, to scrape up continuously suspended solids deposited on the surface of filter bed so as always to expose fresh filter medium, filtration of the raw waste waters can be continued for a long period of time without filtration resistance being increased, the lowering speed and r.p.m. of the scraper blade can be adjusted at the operator's option in making it rotate while descending automatically and, moreover, the filter bed is usable in its entirety for filtration purposes and thereby the duration of operation is lengthened.

EXAMPLE

Filtration was conducted by employing the apparatuses shown in FIG. I, wherein crushed and sized coal with an average particle-diameter of 10 mesh was packed up to a height of 1 m. to form filter beds 3a and 4a, respectively, and municipal sewage containing 115 p.p.m. of BOD5 and 112 p.p.m. of suspended solids was fed into the apparatus as raw water, while the scraping operation of filter bed was conducted in the 1st filter tank only. After aeration for 10 min. in reservoir 2, the dissolved oxygen in the raw waste water was 5.3 p.p.m. and this reduced to 0.5 p.p.m at the outlet of the 1st filter tank, whereas it was 1.6 p.p.m at the inlet of the 2nd filter tank 4 and became 0.5 p.p.m. in the effluent. The effluent contained 27.6 p.p.m. of BOD and less than 5 p.p.m. of suspended solids. When the same raw waste water was filtrated without aeration (in other words, without feeding air through air diffusing pipe 6 as well as through compressor 9), the effluent contained 85 p.p.m. of BOD and less than 5 p.p.m. of suspended solids, and the amount of dissolved oxygen therein was nil. As seen in the foregoing, the amount of BOD in the effluent which did not undergo aeration is so remarkedly large that said water is not suitable for discharge as it was. However, it was found possible to obtain effluent of good quality by means of maintaining raw waste water in an aerobic state through aeration.

We claim:

1. A method for purifying waste water, which comprises the steps of injecting an oxygen-containing gas into waste water contained in a first aeration container in order to aerate said waste water contained in a first aeration container, then feeding the aerated waste water from said first container into the upper end of a second filtration container containing a filter bed comprised of a particulate filter medium and flowing the aerated waste water downwardly through said bed without further aeration of said waste water is filtered, removing the upper surface layer of the filter medium from the remainder of the filter medium whereby to expose fresh filter medium to the downwardly flowing aerated waste water, and removing filtered waste water from the lower end of the filtration container.

2. A method as claimed in claim 1, in which the filter medium is crushed and sized coal.

3. A method as claimed in claim 1, in which the filtered waste water is then flowed downwardly through a filter bed in a second filtration container.

4. A filtration apparatus, comprising: an upright tank having in the lower portion thereof a filter bed comprised of a particulate filter medium; an upright rotatable shaft in said tank above said filter bed, the lower portion of said shaft being hollow and extending substantially to the surface of said filter bed and terminating in an open end at said surface at the center of said filter bed, said hollow portion of said shaft being coupled to a sludge discharge pipe extending to the exterior of said tank above said bed so that sludge including particles of filter medium flowing into said hollow portion can be discharged from said tank; a scrapper blade mounted on the shaft adjacent said open end of the hollow portion, said blade having a continuous lower edge extending outwardly from said open end of the hollow portion of said shaft substantially to the internal wall of said tank, substantially the entire length of said lower edge of said blade resting on the upper surface of said filter bed, the lower edge of said blade being shaped to direct sludge toward said open end of the hollow portion of said shaft, said open end of the hollow portion of said shaft adjacent the inner end of said blade permitting sludge directed toward said shaft by said blade to enter said hollow portion of said shaft; means located outside said shaft for supplying liquid into said tank above said filter bed; first drive means for rotating said shaft and for causing said scraper blade to rotate with said shaft; and second drive means, separate from said first drive means, for moving said shaft downwardly and thereby causing said scraper blade to move downwardly in said tank.

5. A filtration apparatus according to claim 4, in which the scraper blade is curved in the shape of a spiral.

References Cited

UNITED STATES PATENTS

| | | | |
|---|---|---|---|
| 297,364 | 4/1884 | Farquhar et al. | 210—272 |
| 577,686 | 2/1897 | Jewell | 210—272 |
| 1,574,556 | 2/1926 | Coe | 210—272X |
| 3,232,434 | 2/1966 | Albersmeyer | 210—17X |
| 3,401,114 | 9/1968 | Carlton et al. | 210—40X |

MICHAEL ROGERS, Primary Examiner

U.S. Cl. X.R.

210—63, 80, 199, 201, 203, 205, 272

UNITED STATES PATENT OFFICE
CERTIFICATE OF CORRECTION

Patent No. 3,547,816                                            December 15, 19

Tadao Horiguchi et al.

It is certified that error appears in the above identified patent and that said Letters Patent are hereby corrected as shown below:

Column 6, line 6, "waste water is filtered, removing tl upper surface layer" should read -- waste water in said filtration container so that the waste water is filtered, removing the upper surface layer --.

Signed and sealed this 30th day of March 1971.

(SEAL)
Attest:

EDWARD M. FLETCHER, JR.                            WILLIAM E. SCHUYLER,
Attesting Officer                                         Commissioner of Pater